June 8, 1971  J. L. TERRELL ET AL  3,583,040
SPRING PIN
Filed March 5, 1969
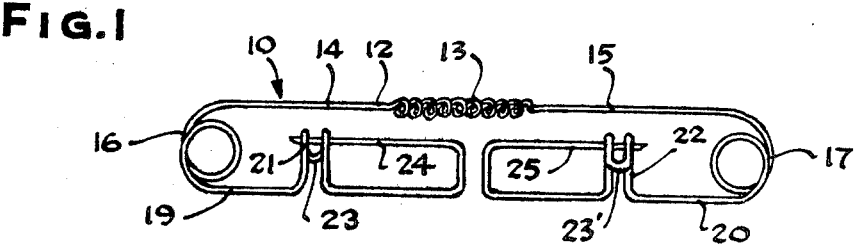
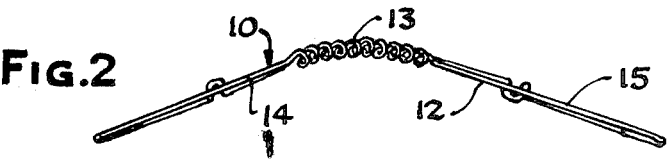
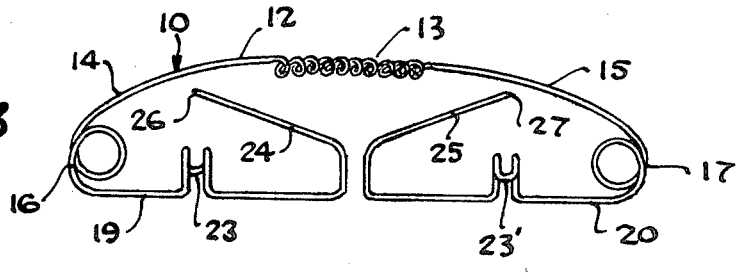
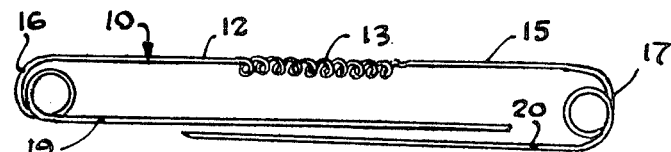
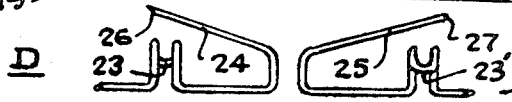
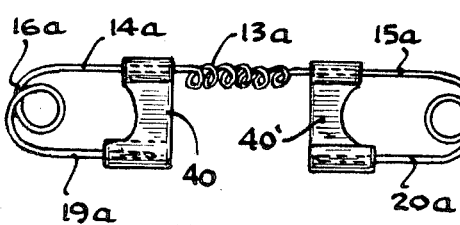
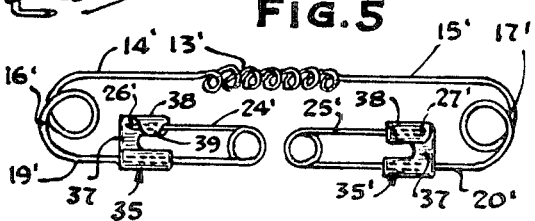
Inventors
James L. Terrell
Robert H. Terrell, Sr.
By Hibben, Noyes & Bicknell
Attorneys

# United States Patent Office 3,583,040
Patented June 8, 1971

3,583,040
SPRING PIN
James L. Terrell and Robert H. Terrell, Sr., both of 1020
Broadway St., North Chicago, Ill. 60064
Filed Mar. 5, 1969, Ser. No. 805,394
Int. Cl. A44b 9/10, 9/12
U.S. Cl. 24—156                                    6 Claims

ABSTRACT OF THE DISCLOSURE

A spring-type pin fastener having two fastener members comprising two axially aligned movable piercing arm members having their pointed ends extending in opposite axial directions with co-acting latch means for releasably retaining each piercing arm member in closed position and having a common main body section which has a spring coil means formed between the ends thereof enabling the body section to be resiliently bent laterally and/or extended longitudinally.

The present invention relates generally to a spring-type pin fastener of the type generally used for connection of two sections of fabric or the like material, and more particularly to a safety-type spring pin having two spaced fastener members symmetrically disposed with a common main body section provided with spring means between the ends thereof for resiliently extending longitudinally or bending laterally.

In certain applications of conventional spring pins or safety pins, such as a diaper pin, where pins of relatively large size are required, objectionable pressure is applied to the body surface because the pin is unyielding and unable to conform to the curvature of the body. In some instances the sections of material connected are torn, because the pin does not have the ability to resiliently yield longitudinally in response to tension exerted on the material. Also, in other applications of spring-pins, particularly those of large size, objectionable bulges are created under clothing when the supporting surface of the body has a marked curvature at the point of attachment of the pin.

It is therefore an object of the present invention to provide a spring pin which is adapted to conform generally to the curvature of a supporting surface.

It is also an object of the present invention to provide a spring pin which is capable of resiliently yielding under tension longitudinally and/or laterally.

It is still another object of the present invention to provide a spring pin which is capable of resiliently exerting a tension on sections of material to which it is secured.

It is a further object of the present invention to provide a spring type pin which exerts a more even distribution of pressure on a supporting surface than a conventional safety pin.

Other objects of the present invention will be apparent to those skilled in the art from the following detailed description and claims when read in conjunction with the accompanying drawing wherein:

FIG. 1 is a side elevational view of a pin embodying the present invention in closed position;

FIG. 2 is a side elevational view of the pin of FIG. 1 in open position;

FIG. 3 is a top plan view of the pin of FIG. 1 in contact with a curved supporting surface;

FIGS. 4A through 4D is a schematic representation of the sequence of steps followed in forming the pin of FIGS. 1–3;

FIG. 5 is an elevational view of a modified form of invention; and

FIG. 6 is an elevational view of still another modified form of the present invention.

The embodiment of the present invention shown in FIGS. 1–4 of the drawing comprises a spring pin 10 of an elongated section of wire 11 which can be heat treated in any conventional manner to impart resilience thereto. The spring pin 10 has a main body section 12 with a spring coil 13 formed between the ends thereof and straight upper arm sections 14, 15 extending axially in opposite directions from the ends of the coil 13. The outer end of each of the straight upper arm sections 14, 15 extends downwardly and is bent upon itself to form a depending torsion spring loop 16, 17, respectively, with the outer leg of each extending axially inwardly from the lower side of loops 16, 17 to form the lower stationary arm sections 19, 20, respectively, of a spring pin fastener member. The stationary arm sections 19, 20 are disposed in spaced parallel relationship with the upper arm sections 14, 15. The lower stationary arm sections 19, 20 have formed intermediate the ends thereof upwardly extending hook sections 21, 22, respectively, with the upper portion of the hook sections 21, 22 being turned downwardly in a plane generally perpendicularly to the longitudinal plane of the lower sections 19, 20, as at 23, 23', respectively. The inner ends of lower stationary arm sections 19, 20 extend axially inwardly from the base of the hook sections 21, 22 and are bent upwardly at about the mid-point of the coil 13 and then extend axially outwardly to provide axially extending movable piercing arm sections 24, 25 having pointed end portions 26, 27, respectively, which lie in an axial horizontal plane between the upper and lower arm sections. If desired, small torsion typespring loops similar to loops 16, 17, can be formed between the sections 19, 20 and the movable piercing arm sections 24, 25, respectively. The pointed end portions 26, 27 extend axially beyond the center of the hook portions 22, 23, respectively, so as to permit the piercing arm sections 24, 25 engaging with the hook portion 23, 23', respectively, to hold each of the piercing arms 24, 25 in closed position.

It will be evident from the sequential FIGS. 4A through 4D that the spring pins of FIGS. 1–3 can be readily made from a single section of wire 11 by first forming the spring coil 13 intermediate the ends thereof and then forming at the outer ends of the axially extending upper sections 14, 15, depending torsion spring loops 16, 17 with the lower stationary arm sections 19, 20 of the wire extending inwardly substantially parallel to the upper arm sections 14, 15 and forming in the lower stationary arm sections 19, 20 the hook portions 21, 22 spaced slightly inwardly from the depending loops 16, 17, respectively. The inner ends of the lower sections 19, 20, are then bent upwardly and outwardly to provide the movable piercing arm sections 24, 25. After the spring pin 10 is formed from the wire 11 as above described, the pin 10 is heat treated in any conventional manner to impart thereto any desired degree of resilience.

In the modified form of pin shown in FIG. 5 the integrally formed hook portions 22, 23 of FIGS. 1–4 are each replaced by safety guard-latches 35, 35', respectively, which are attached securely to the lower sections 19', 20' at a point thereon preferably adjacent the resilient loops 16', 17' and extend upwardly toward the arm sections 14', 15', respectively extending from the opposite ends of spring coil 13'. Each of the safety guard-latches 35, 35' is adapted to engage and protectively enclose one of the pointed end portion 26', 27' of arm sections 24', 25', respectively, to hold in closed position the individual spring pin fastener units which are connected to the oppositely disposed spring loops 16', 17'. The safety guard-latches 35, 35' can have the general structure of the guard portion of a conventional safety type pin which is modified, however, so as to be folded around the sections 19', 20' at a point intermediate the ends thereof, rather than being mounted on the end of a section of wire as with a conventional safety pin. The guard-latches 35, 35', are preferably formed of a single piece of metal or can be molded of plastic, if desired.

Each of the guard-latches 35, 35' shown in FIG. 5 of the drawings comprises a lower body portion 36 which is crimped about the arm section 19' or otherwise formed into locking engagement with the arm sections 19', and has an upwardly extending body portion 37. The upwardly extending portion 37 has an apron portion 38 which is bent upon itself to form (in cross section) a depending semi-circular cover or guard portion 39 which is disposed symmetrically with respect to the vertical plane of the lower arm sections 19', 20'. The piercing end portions 26', 27' of the movable arm sections 24', 25' are adapted to engage the inner lower surface of the depending semi-circular cover on guard portion 39 of the latch 35 so as to hold the movable arm sections 24', 25' of each spring pin fastener unit in closed position.

In the still further modified form of the pin shown in FIG. 6, a guard-latches 40, 40' having the same structure as the guard-latches 35, 35' are securely mounted on the upper sections 14a, 15a, respectively, adjacent the opposite ends of the coil 13a and extends inwardly in the plane of the torsion loops 16a, 17a toward the lower portion 19a, 20a. In the latter modification, the lower section 19a, 20a which are straight axially inwardly extending piercing sections 24a, 25a with piercing end sections 26a, 27a are adapted to detachably engage the guard-latches 40, 40'.

Each of the spring pins having the herein described structure can be used to connect two portions of fabric or the like material by engaging one portion of fabric of by means of one of the movable piercing arm sections and holding the first portion of the fabric therewith by engaging the piercing arm section with hook or guard portion disposed adjacent the pointed end thereof. The other portion of fabric is then engaged by the other piercing arm section and held by bringing the piercing arm section into an engagement with the hook or guard adjacent the end thereof. If desired, the fabric portions to be joined can be overlapped and both of the piercing arm sections can be inserted through the overlying portions of hte fabric and the piercing arm sections locked thereon by engaging the movable arm section with the hook or guard portions adjacent the ends thereof, respectively.

I claim:

1. A double latch spring pin comprising a main body section of resilient wire with a spring means formed between the ends thereof comprised of a spring coil adapted for both transverse and longitudinal resilient movement, and said main body section having integrally connected at the opposite ends thereof a spring fastener means for engaging a section of material.

2. A spring pin as in claim 1 wherein said spring coil has an upper arm section extending from each end of said coil with a torsion spring loop means at the outer ends of each of said upper arm sections and each said loop means having integrally connected therewith said spring fastener means for engaging a section of material.

3. A spring pin as in claim 2 wherein each of said loop means a resiliently stationary lower arm section extending axially inwardly from the lower edge thereof and has formed intermediate the ends thereof an upwardly extending hook means for engaging an end portion of a movable arm section which extends outwardly from the inner end of said stationary lower arm section which together form said spring fastener means.

4. A spring pin as in claim 2 wherein each of said loop means has an arm section extending axially inwardly from the lower edge thereof and has a guard-latch means securely fastened thereto adjacent the outer end thereof and having at the inner end thereof at about the mid-point of said spring coil and outwardly extending movable arm member adapted to piercing a section of material and engagable with said guard-latch means and together forming said spring fastener means.

5. A spring pin as in claim 2 wherein each of said loop means has a lower arm section extending axially inwardly from the lower edge thereof to a point opposite the proximate end of said spring coil and each of said upper arm sections having secured thereto adjacent the ends of said spring coil a latch-guard means for releasably engaging an oppositely disposed end portion of a said lower arm section and together forming said spring fastener means.

6. A spring pin as in claim 1 wherein said spring means has an end section extending from the opposite ends thereof with said end sections being maintained in spaced relationship, and each said end section having a fastener means for engaging a section of material.

References Cited

UNITED STATES PATENTS

| 1,248,123 | 11/1917 | Huckbody | 242—161 |
| 1,321,534 | 11/1919 | Mantle | 242—161 |

LEONARD D. CHRISTIAN, Primary Examiner

U.S. Cl. X.R.

D2—413